United States Patent [19]
Sirmon et al.

[11] Patent Number: 5,194,845
[45] Date of Patent: Mar. 16, 1993

[54] COMBINATION U-LOCK AND SECURITY LOOP WITH TAMPER ALARM

[75] Inventors: James B. Sirmon, Surbiton; Ivan F. S. Foti, Hounslow, both of England

[73] Assignee: Malcolm I. Weaver, Middlesex, Great Britain

[21] Appl. No.: 566,542

[22] Filed: Aug. 13, 1990

[30] Foreign Application Priority Data

Aug. 16, 1989 [EP] European Pat. Off. ......... 89308298.2

[51] Int. Cl.$^5$ .......................... G08B 13/12; B62H 5/20
[52] U.S. Cl. .......................................... 340/427; 70/39; 70/233; 200/61.64; 340/542; 340/568
[58] Field of Search ............... 340/542, 427, 568; 200/61.64; 70/434, 432, 439, 57, 39, 233

[56] References Cited

U.S. PATENT DOCUMENTS

| | | | |
|---|---|---|---|
| 3,879,721 | 4/1975 | Yereance | 340/427 |
| 3,993,987 | 11/1976 | Stevens | 340/427 |
| 4,085,600 | 4/1978 | Bindari | 70/39 |
| 4,155,231 | 5/1979 | Zane et al. | 70/233 |
| 4,188,808 | 2/1980 | Valdez | 70/233 |
| 4,811,157 | 3/1989 | Masoncup et al. | 340/542 |
| 4,987,753 | 1/1991 | Kuo | 70/39 |

*Primary Examiner*—Glen R. Swann, III
*Attorney, Agent, or Firm*—Fay, Sharpe, Beall, Fagan, Minnich & McKee

[57] ABSTRACT

A portable security lock of the "U-bar" type includes a rigid "U" or "C" shaped security bar (8), and a flexible security loop (14) and a generally tubular cross member (2). The cross member has a pair of sockets each of which is adapted to cooperate with a suitably shaped end of the security bar or loop, and an internal rotatable barrel member (26) having keyhole slots (28, 30, 32) which receive the shaped ends in a first rotational position. The barrel member is then rotated to a second position in which the shaped ends are locked into the cross-member. Electrical contacts connect the barrel to an alarm via the security loop so that the alarm is triggered if the security loop is removed or broken while the alarm is set.

11 Claims, 3 Drawing Sheets

COMBINATION U-LOCK AND SECURITY LOOP WITH TAMPER ALARM

BACKGROUND AND PRIOR ART

This invention relates to alarm locks, that is to say, locking devices including built-in alarm systems, and particularly to portable locking devices adapted for attachment to articles such as bicycles, motor-bikes and the like, to prevent them from being stolen.

Various types of alarms of this kind have been proposed previously, but their mechanical construction is frequently complicated, for example by requiring special lock mechanisms, and very often, they are not as robust as the simple "U-bar" or "padlock type" locking device.

SUMMARY OF THE INVENTION

Accordingly, the present invention seeks to provide an alarm lock which is robust, of simple construction, and provides excellent security against theft, as well as an alarm system which is extremely difficult for an unauthorised person to disable.

Accordingly, the present invention provides an alarm lock of the "U-bar" type, comprising a rigid "U" or "C" shaped security bar, and/or a flexible security loop and a generally tubular cross member, having at least one pair of sockets each of which is adapted to cooperate with a suitably shaped end of the security bar or loop, the cross-member also comprising a rotatable barrel member having at least one shaped cut-out adapted to receive one of the said shaped ends, in a first position and the barrel member then being rotatable to a second position in which the shaped end is locked into the cross-member.

Preferably the rotation is achieved by means of a key, although it is also envisaged that a combination lock of the rotatable cylinder type could be incorporated.

Preferably, the formation on the end of the U-bar or security loop comprises a "neck" a short distance from the end, and the cooperating cut-out in the barrel member comprises a "keyhole" shape, the largest part of which is of a suitable diameter to allow the shaped end to pass through it, whilst the narrow portion is adapted to fit closely around the "neck". In this way, it will be appreciated that the U-bar or security loop can be locked in position, after its end has been inserted into the barrel member, simply by rotating the barrel member.

Preferably, the barrel member also houses electrical contacts for the alarm system which are adapted to cooperate with at least one of the ends of the U-bar or security loop, so that when the alarm is armed, any subsequent removal of one of these ends, or breaking of the bar or security loop, will set off the alarm.

A flashing "LED" indicator lamp may also be incorporated to indicate that the device is "armed".

Preferably, the tubular cross-member also includes a battery housing, the arrangement being such that the battery housing cannot be opened, without first detaching the "U-bar".

BRIEF DESCRIPTION OF THE DRAWINGS

One embodiment of the invention will now be described by way of example, with reference to the accompanying drawings in which.

DETAILED DESCRIPTION OF THE PREFERRED EMBODIMENT

Figure 1:
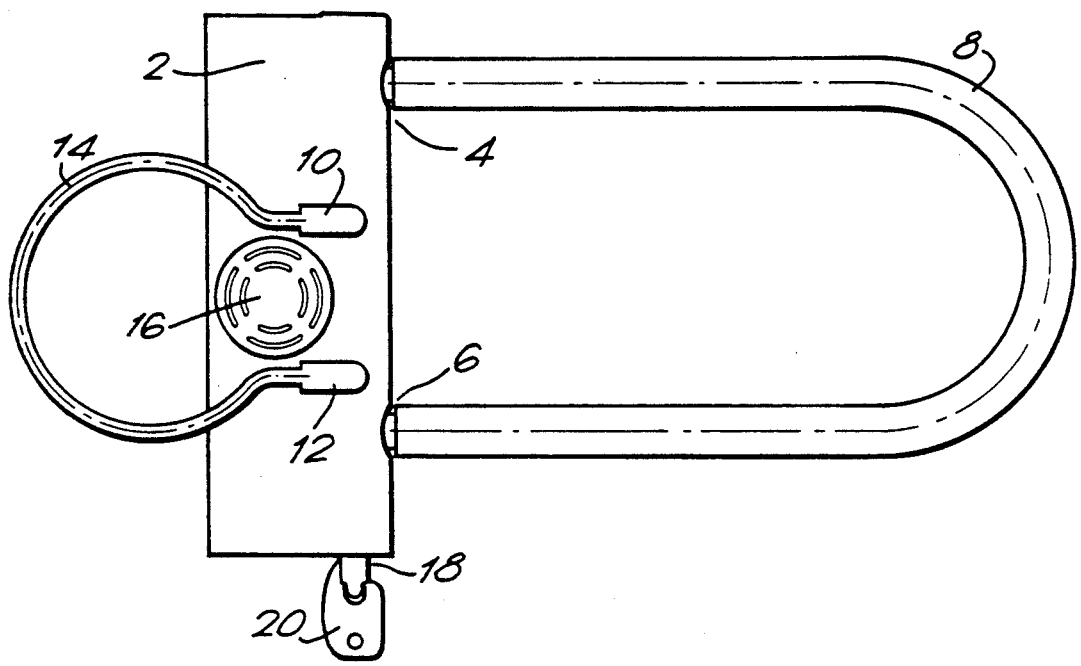
FIG. 1 is an overall plan view of the alarm lock in the engaged position.
Figure 6:
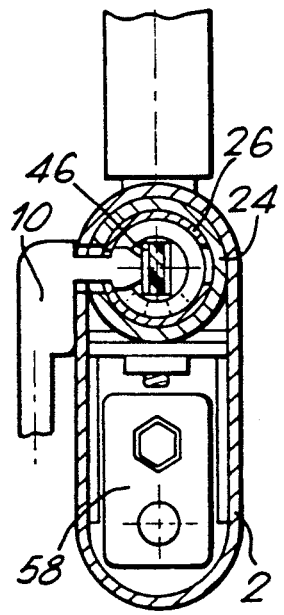
FIG. 6 is a cross-sectional view taken on the line VI—VI of FIG. 2.

Referring to FIG. 1, it will be seen that the main body of the alarm lock comprises a cross-member comprising a casing 2, having apertures 4 and 6 into which the ends of a U-bar 8 are locked, in use.

The casing 2 also incorporates a further pair of sockets which receive plug members 10 and 12 on the ends of a conductive security loop 14. A warning siren is mounted in the casing behind the cover 16, and one end of the casing carries a key aperture 18, in which a key 20 can be inserted for rotation to actuate the lock mechanism.

Figure 5:
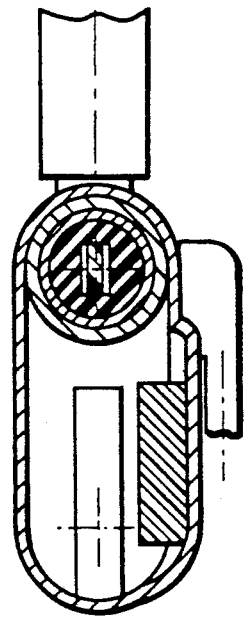
FIG. 5 is a cross-sectional view on the line V—V of FIG. 2.
Figure 2:
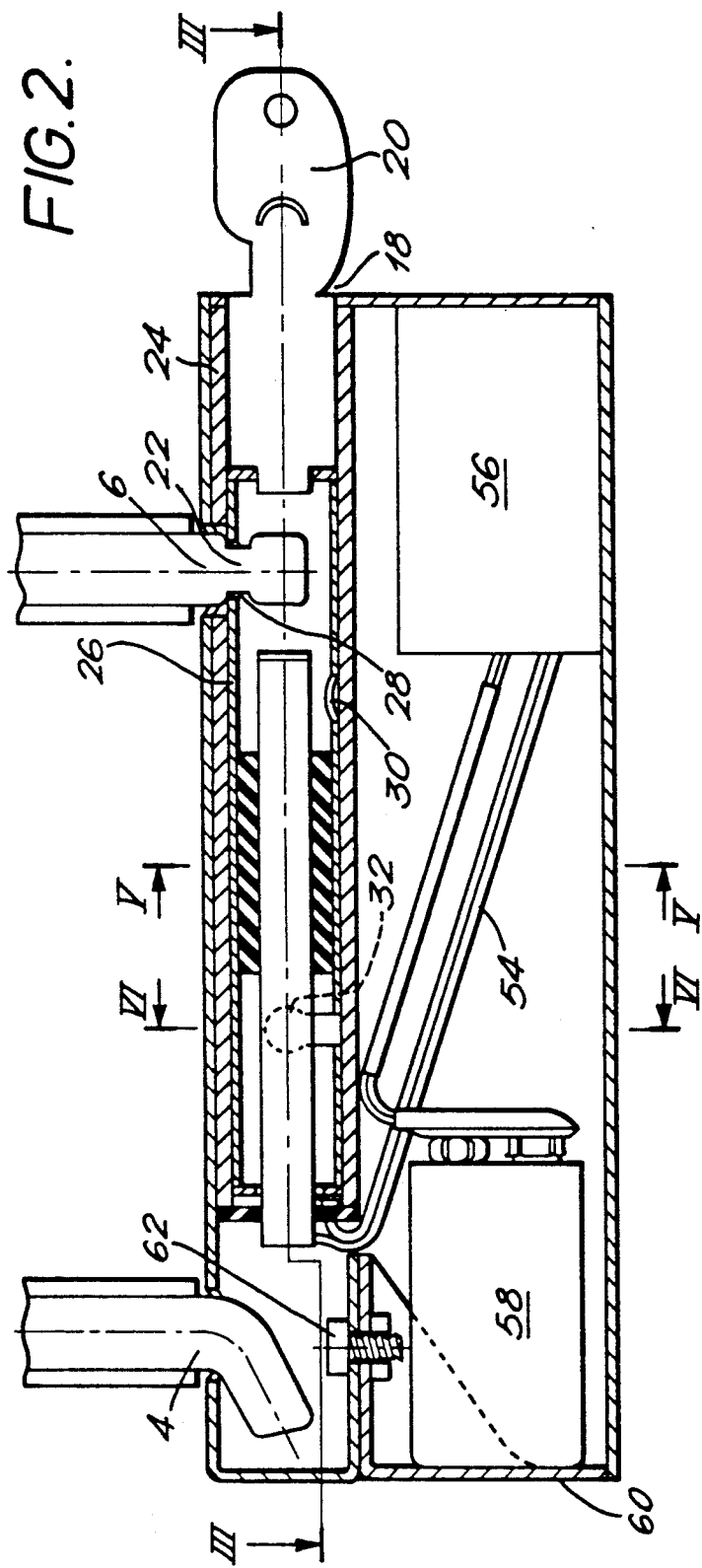
FIG. 2 is an axial cross-section through the "crossbar" of the lock.

Referring to FIG. 2, which shows the internal parts of casing 2 in more detail, it will be seen that the aperture at one end of the casing, which receives the end 4 of the U-bar, is a simple round hole, the end of the U-bar being bent at an angle, so that it is retained in the hole so long as the other end 6 is retained in its corresponding aperture. The end 6 is formed with a neck 22, close to the end, in order to enable the bar to be locked into the casing in the following manner: as best shown in FIG. 5, the casing is of a flattened tubular cross-section, and the upper portion, as seen in FIGS. 2 and 5, encloses a cylindrical housing 24. The key aperture 18 is mounted at the outer end of this cylindrical housing.

A rotatable lock barrel 26 is mounted coaxially in the housing, and carries a series of keyhole shaped slots, 28, 30, 32, spaced apart along the length of the tube, and whose "heads" are in circumferentially staggered positions, relative to one another.

The aperture 28 has a "head" which is large enough to accommodate the end 6 of the U-bar, so that, when the barrel 26 is in a suitable angular position, the end 6 can be inserted through the head of the keyhole shaped aperture 28, and subsequently, when the barrel is rotated by turning the key 20, the "tail" of the keyhole shaped aperture engages around the neck 22, thus securing the U-bar in position.

The other two keyhole shaped apertures 30, 32, act to retain the ends 10 and 12 of the security loop 14, in a similar manner. As can best be seen from FIG. 3, the ends 10 and 12 are formed as right angled "plug" members, having enlarged ends 34 and 36, which can pass through correspondingly sized apertures 38 and 40 in the outer casing 2, and are subsequently trapped in the keyhole shaped apertures 30, 32, by rotation of the tubular member 26, in the same way as the end 6 of the U-bar.

The arrangement of the keyhole shaped apertures 28 and 32, is such that their heads are aligned with the corresponding apertures on the casing, when the alarm is in the fully unlocked position, so that the end 6 of the security bar, and the end 10 of the security loop 14, can both be inserted into their respective apertures, and the key turned through a first portion of its rotation, so as to retain them in position. After the first movement of the key, (for example through 90°), the head of keyhole aperture 30 is aligned with the corresponding aperture 40 of the casing, so that the "plug" of end 12 of the security loop, can be inserted. The key is then turned through a further 90°, so that the barrel 26 reaches the position shown in FIG. 3, at which both the U-bar 8 and the security loop 14 are fully locked in position. It will be appreciated from the above description, that the keyhole aperture 32 has a somewhat longer "tail" 42, so as to allow for rotation of the barrel 26 through a 180°, whilst the head 10 of the security loop is engaged in it.

Figure 3:
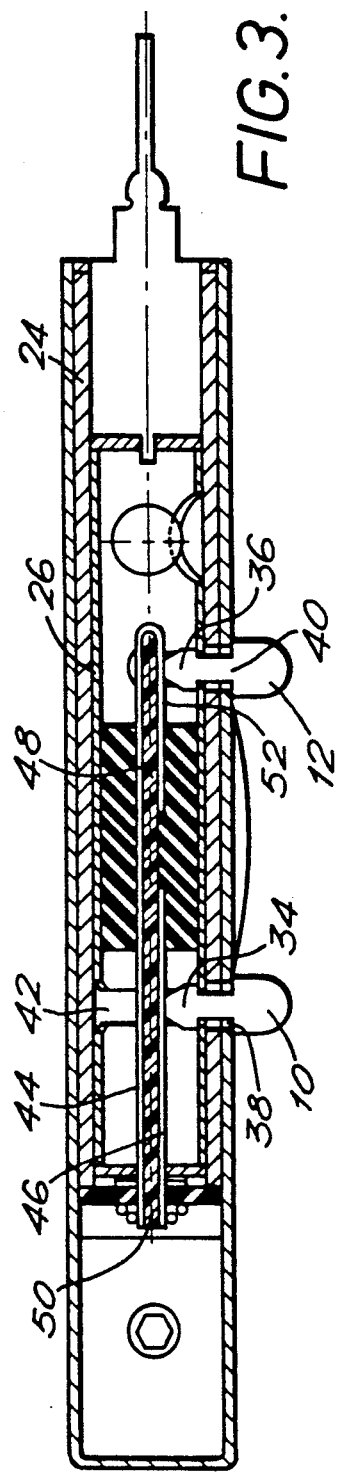
FIG. 3 is a cross-section taken on the line III—III of FIG. 2.

Turning now to the electrical construction of the device, as shown in FIGS. 2 and 3, a pair of contact strips 44 and 46 are mounted on a non-rotating insulating strip 48 whose outer end 50 is fixed in a stationary washer 52, fixed to the end of the stationary tube 24. One contact 44 comprises a flat conductive strip which extends along the length of the insulating support member 48, and is bent around the other end, so as to extend along the opposite surface, as indicated at 52. This enables it to be contacted by the "plug" 36 of the end 12 of the security cable, when the latter is in its fully engaged position.

Figure 4:
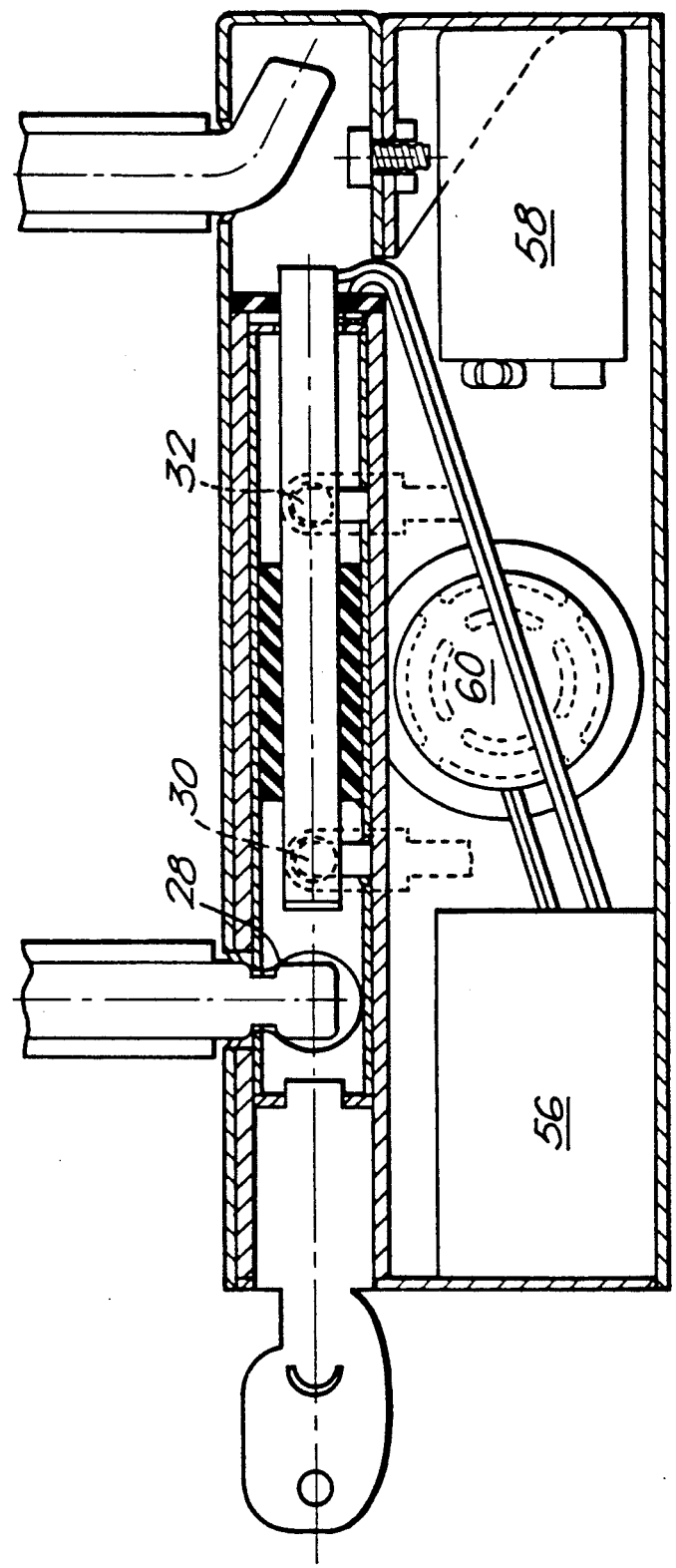
FIG. 4 is a cross-sectional view corresponding to that of FIG. 2, but taken from the other side.

The other contact strip 46 extends a part of the way along the same side of the support member 48, so as to be similarly contacted by the plug 34 on the end 10 of the security cable, and thus to complete the alarm circuit, when the device is in the fully locked position. As will be evident from FIGS. 2 and 4, wires 54 connect the contacts 44 and 46, to a control box 56 within the casing, which is also connected to a battery 58, and a piezoelectric siren 60.

Although not illustrated in detail, it will be appreciated that the key mechanism incorporated in the end of the cylinder 24, includes further electrical contacts, adapted to "arm" and "disarm" the power circuit, so that when the key is turned to the unlocked position, the security cable can be removed, breaking the circuit between the contact strips 46 and 52, without triggering the alarm.

It will also be clear from the construction illustrated at the lefthand end of FIG. 2, that the battery cover cannot be removed, until the end 4 of the security bar 8 is released from the casing 2, i.e. until the device is in an unlocked position. The cover 60 is retained by an Allen screw 62, whose head is only accessible through the aperture of the casing which retains the end 4, and thus it is impossible to remove or disconnect the battery, without first disarming and completely unlocking the device.

We claim:

1. A portable security lock of the "U-bar" type, comprising a rigid "U" or "C" shaped security bar; a flexible security loop; and a generally tubular cross member having pairs of apertures adapted to receive the ends of the security bar and security loop; the cross member also comprising a rotatable barrel member having a plurality of keyhole shaped cut-outs adapted to cooperate with suitable shaped ends of the security bar and security loop, each said cut-out being adapted to receive a correspondingly shaped end in a first position of the barrel member, and the barrel member then being rotatable to a second position in which the shaped end is locked into the cross member; battery housing means in said cross member; and retaining means being arranged beneath one of said apertures so as to be inaccessible while said security bar or loop is mounted in said cross member.

2. A security lock according to claim 1 further comprising an alarm and a key mechanism adapted to rotate the barrel, said key mechanism including switching means for arming and disarming the alarm.

3. A security lock according to claim 1 further comprising an alarm and a set of electrical contacts incorporated into said barrel and adapted to cooperate with at least one of the ends of the security loop so as to trigger the alarm when it is armed if a cooperating one of said ends is removed or the circuit is otherwise broken.

4. A security lock according to claim 1, in which the barrel incorporates a pair of contacts and the bar or loop is adapted to complete a circuit between them.

5. A portable security lock of the "U-bar" type comprising a rigid "U" or "C" shaped security bar, having at least one end which is shaped to form a neck portion, a cross member having a pair of apertures to receive the ends of the security bar, and a rotatable barrel member mounted in said cross member and having at least one keyhole shaped slot having an enlarged end portion which is of a suitable diameter to allow the shaped end to pass through it in a first rotational position of the barrel, while the narrower portion extends in a circumferential direction and is adapted to fit closely around the neck so as to lock it into the cross member, in a second position.

6. A security lock according to claim 5 further comprising an alarm and a key mechanism adapted to rotate the barrel, said key mechanism including switching means for arming and disarming the alarm.

7. A security lock according to claim 5, in which the barrel incorporates a pair of contacts and the bar is adapted to complete a circuit between them.

8. A portable security lock of the "U-bar" type comprising a rigid "U" or "C" shaped security bar, and a flexible security loop, each having neck portions on the ends thereof; a generally tubular cross member, the cross member including apertures to receive the ends of the security bar and security loop; and a rotatable barrel member having a plurality of circumferentially extending keyhole shaped slots adapted to cooperate with the neck portions of the U-bar and security loop;

the positions of the enlarged end portions of the keyhole slots being staggered around the circumference of the barrel, and the arrangement being such that first one of said ends of said security loop can be inserted in the first rotational position of the barrel in order to fix it in position, and the barrel can then be rotated to a further position in which a remaining end can be inserted and subsequently locked in position.

9. A security lock according to claim 8 further comprising an alarm and a key mechanism adapted to rotate the barrel, said key mechanism including switching means for arming and disarming the alarm.

10. A security lock according to claim 8 further comprising an alarm and a set of electrical contacts incorporated into said barrel and adapted to cooperate with at least one of the ends of the security loop so as to trigger the alarm when it is armed if a cooperating one of said ends is removed or the circuit is otherwise broken.

11. A security lock according to claim 8, in which the barrel incorporates a pair of contacts and the bar or loop is adapted to complete a circuit between them.

* * * * *